(12) United States Patent
Wuebbeling

(10) Patent No.: US 10,300,417 B2
(45) Date of Patent: May 28, 2019

(54) FILTER ELEMENT AND FILTER ARRANGEMENT

(71) Applicant: MANN+HUMMEL GMBH, Ludwigsburg (DE)

(72) Inventor: Martin Wuebbeling, Mannheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 139 days.

(21) Appl. No.: 15/447,270

(22) Filed: Mar. 2, 2017

(65) Prior Publication Data

US 2017/0252688 A1  Sep. 7, 2017

(30) Foreign Application Priority Data

Mar. 3, 2016 (DE) .......... 10 2016 002 486

(51) Int. Cl.
| | |
|---|---|
| *B01D 46/00* | (2006.01) |
| *F02M 37/24* | (2019.01) |
| *B01D 46/10* | (2006.01) |
| *F01M 1/10* | (2006.01) |
| *F02M 25/022* | (2006.01) |
| *B01D 46/24* | (2006.01) |

(52) U.S. Cl.
CPC ....... *B01D 46/0005* (2013.01); *B01D 46/001* (2013.01); *B01D 46/0021* (2013.01); *B01D 46/10* (2013.01); *B01D 46/2411* (2013.01); *F01M 1/10* (2013.01); *F02M 25/0224* (2013.01); *F02M 37/24* (2019.01); *B01D 2265/026* (2013.01); *F01N 2610/1426* (2013.01); *Y02T 10/121* (2013.01)

(58) Field of Classification Search
CPC .... B01D 46/24; B01D 46/08; B01D 46/0004; B01D 46/0005; B01D 45/12; B01D 46/10; B01D 46/42; B01D 39/00
USPC ...... 55/498, 502, 503, 504, 493, 385.3, 423, 55/521; 95/273; 96/189; 123/198 E
See application file for complete search history.

(56) References Cited

U.S. PATENT DOCUMENTS

| | | | | |
|---|---|---|---|---|
| 6,039,778 | A * | 3/2000 | Coulonvaux | B01D 46/24 55/498 |
| 6,264,712 | B1 * | 7/2001 | Decker | B01D 45/08 55/445 |
| 8,216,335 | B2 * | 7/2012 | Scott | B01D 46/0005 55/385.3 |
| 2010/0043367 | A1 * | 2/2010 | Desjardins | B01D 46/0005 55/493 |
| 2010/0257828 | A1 * | 10/2010 | Shimomura | B01D 46/0004 55/493 |
| 2012/0198802 | A1 | 8/2012 | Menssen | |

\* cited by examiner

*Primary Examiner* — Duane Smith
*Assistant Examiner* — Minh Chau T Pham
(74) *Attorney, Agent, or Firm* — James Hasselbeck

(57) ABSTRACT

A filter element (3), in particular an air filter element, for a filter arrangement (1), having a frame (6) that has at least one contact surface (11) for contacting a clamping surface (30) of at least one clamping element (27, 28) of the filter arrangement (1), wherein the at least one contact surface (11) includes straight segments (12, 13, 14) and oblique segments (15, 16) arranged between the straight segments (12, 13, 14), and wherein the straight segments (12, 13, 14) are arranged such that the clamping surface (30) when the latter is displaced relative to the at least on contact surface (11) essentially exclusively contacts the oblique segments (15, 16).

12 Claims, 14 Drawing Sheets

FILTER ELEMENT AND FILTER ARRANGEMENT

TECHNICAL FIELD

The present invention relates to a filter element, in particular an air filter element, and a filter arrangement with such a filter element.

BACKGROUND

DE 10 2010 047 491 A1 describes a filter arrangement with a filter housing, a filter element received in the filter housing, and a cover with clamping brackets for clamping the filter element in the filter housing. The filter element comprises two contact surfaces provided on a frame thereof and the clamping brackets comprise clamping surfaces corresponding to the contact surfaces. During assembly, especially before the cover has reached a final position in which the filter element is clamped in the filter housing, all segments of the contact surfaces that are parallel to a sealing surface are already in surface contact, which is the reason that frictional forces must be applied over a certain stretch during assembly of the cover.

SUMMARY

It is therefore the object of the invention to make available an improved filter element.

Consequently, a filter element, in particular an air filter element, for a filter arrangement is suggested. The filter element comprises a frame that comprises at least one contact surface for contacting a clamping surface of at least one clamping element of the filter arrangement, wherein the at least one contact surface comprises straight segments and oblique segments arranged between the straight segments, and wherein the straight segments are arranged such that the clamping surface when the latter is displaced relative to the at least one contact surface essentially (for the most part) and preferably exclusively contacts the oblique segments.

The filter arrangement and in particular the filter element are preferably designed for filtering fluids, such as for example air or other gases, liquids, especially operating fluids for a vehicle, especially a motor vehicle, such as oil, water, diesel fuel, gasoline, kerosene, or urea solution. In particular, the filter element is an air filter element. The filter element and the filter arrangement may be used in motor vehicles, watercraft, rolling stock, agricultural vehicles, construction equipment, aircraft, and the like. Furthermore, the filter element and the filter arrangement may also be used in non-mobile applications, such as for instance in building system engineering. The filter element may comprise a pleated filter medium.

Since the clamping surface exclusively contacts the oblique segments of the at least one contact surface, low forces may be achieved during assembly and disassembly of the filter element. The straight segments are preferably arranged parallel to a front side of the frame and the oblique segments are preferably arranged inclined towards the front side. The straight segments and the oblique segments are arranged in an alternating manner. The straight segments are set back compared to known filter elements.

In embodiments, the oblique segments each comprise slide segments that are designed to contact the clamping surface when the clamping surface is displaced relative to the at least one contact surface. There is preferably a contact exclusively via the slide segments when the clamping surface is displaced relative to the at least one contact surface. This reduces the friction forces.

In embodiments, a first straight segment is set back, with respect to a front side of the frame, behind a first slide segment, and/or a second straight segment is set back, with respect to the front side of the frame, behind a second slide segment. Set back shall be construed to mean that the straight segments are positioned closer to the front side and/or filtered air side and/or sealing side than the slide segments. The frame is preferably a plastic injection molded component.

In embodiments, a first oblique segment is inclined at a first angle to a front side of the frame and/or a second oblique segment is inclined at a second angle to the front side of the frame. The first angle and the second angle may be, for instance, between 3° and 15°.

In embodiments, the first angle differs from the second angle. Alternatively, the first angle and the second angle may be the same.

In embodiments, the filter element comprises two contact surfaces that are arranged on the edge of the frame, wherein the two contact surfaces are geometrically different from one another. The fact that the contact surfaces are geometrically different from one another shall be construed to mean that the oblique segments may be inclined differently and/or that the oblique and/or the straight segments may have different linear extensions.

In embodiments, the first angles of the first oblique segments of the two contact surfaces differ from one another and/or the second angles of the second oblique segments of the two contact surfaces differ from one another. Therefore, only filter elements whose contact surfaces are embodied correspondingly to the different clamping surfaces of the clamping elements may be received in a filter housing of the filter arrangement. This means that a lock-and-key principle may be realized so that only fitting filter elements may be received in the filter housing. Incorrect assembly may also be prevented by this, since the filter element can only be received in the filter housing in one possible position.

In embodiments, the filter element has a sealing element that has a Shore A hardness of 22 to 55, preferably 27 to 41, more preferably 32 to 39, more preferably 34 to 37. Since the sealing element has a low Shore A hardness, especially compared to the prior art, the assembly forces are further reduced when pressing the sealing element. The sealing element may be made of an elastomer, for instance a thermoplastic elastomer or a foamed polyurethane material.

The invention further relates to a filter element, in particular an air filter element, for a filter arrangement, with a frame that comprises at least one contact surface for contacting a clamping surface of at least one clamping element of the filter arrangement, wherein the at least one contact surface comprises at least two oblique segments, especially with respect to an assembly direction, that are in particular offset in the assembly direction, and wherein the oblique segments are offset such that the second oblique segment essentially begins at the height at which the first oblique segment ends, wherein the contact surface is configured outside of the oblique segments such that when installed the oblique segments essentially exclusively contact the clamping surface. These features represent both an independent invention that attains the object and a possible refinement of a filter element and an air filter arrangement as described in the foregoing and in the following.

Furthermore, a filter arrangement, in particular an air filter arrangement, having a filter housing, such a filter element that can be received in the filter housing, and at least one clamping element (preferably two clamping elements) for clamping the filter element in the filter housing such that, when at least one clamping element is in a final position, the filter element is pressed against a sealing surface of the filter housing, is suggested, wherein when the at least one clamping element is displaced inward into the filter housing from a starting position into a final position, the filter element may be displaced by sliding the clamping surface on the at least one contact surface in a sealing direction onto the sealing surface, and wherein, in the final position, a force for pressing the filter element against the sealing surface using at least one oblique segment of the clamping surface may be transmitted to at least one of the oblique segments of the at least one contact surface.

In the final position, the force for pressing the filter element against the sealing surface using a plurality of oblique segments of the clamping surface may preferably be transmitted simultaneously to a plurality of oblique segments of the at least one contact surface. In particular, in the final position the oblique segments are in surface contact, that is, their entire surfaces are preferably in contact with one another. Preferably exactly one, two, or three oblique segments are provided. The oblique segment or segments are preferably arranged symmetrical to the center of the filter element. For example, if exactly one oblique segment is provided, it is arranged in the center relative to the filter element. The clamping element may also be called a clamping bracket. Inward displacement may also be called inward sliding.

The at least one oblique segment of the clamping surface or the at least one oblique segment of the at least one contact surface is preferably inclined relative to the sealing surface of the filter housing or to an assembly direction of the at least one clamping element. In particular, the at least one oblique segment of the contact surface and the at least one oblique segment of the clamping surface are each inclined at a pre-determined angle to the sealing surface, especially at the same angle. This means that the at least one oblique segment of the at least one contact surface and the at least one oblique segment of the clamping surface are preferably arranged parallel to one another when assembled. The assembly direction is preferably oriented parallel to the sealing direction. Both the clamping surface and the at least one contact surface preferably also have essentially straight segments that may be arranged essentially parallel to the sealing surface or to the assembly direction.

Since the force for pressing the filter element against the sealing surface in the final position is transmitted in particular essentially or exclusively via the oblique segments, an assembly force for assembling and especially during disassembly of the at least one clamping element is decreased. Surface pressing between the at least one contact surface and the clamping surface is therefore very low. Only short paths and low assembly forces are necessary for releasing the at least one clamping element. It may be particularly advantageous that the disassembly path for which friction must be overcome is relatively short. This may be achieved in that the surfaces that are in contact, especially the clamping surfaces and the contact surfaces, may be disengaged rapidly. The same naturally applies analogously in the other direction for the assembly process, as well. This makes it easier to press the filter element against the sealing surface. In particular the at least one contact surface and the clamping surface face one another.

In embodiments, the force for pressing the filter element against the sealing surface may be transmitted to the at least one oblique segment of the at least one contact surface solely using the at least one oblique segment of the clamping surface. The oblique segments may also be called inclined segments. The at least one contact surface and the clamping surface may each also have flat and/or straight segments that preferably do not touch one another, however, at least in the final position. Gaps may be provided in the final position between each of the straight segments. Since the straight segments do not touch one another and therefore no friction occurs between them, either, the assembly forces and disassembly forces are further reduced towards the end of the insertion process of the at least one clamping element and while the at least one clamping element is being pulled out. Alternatively, the straight segments may also be configured such that in the final position force for pressing the filter element may also be transmitted via these straight segments.

Other possible implementations of the filter element and/or of the filter arrangement comprise combinations of features or embodiments described previously or in the following regarding the exemplary embodiments, even if such combinations are not explicitly cited. The person skilled in the art will also add individual aspects as improvements or supplements to the specific basic form of the filter element and/or the filter arrangement.

Additional embodiments of the filter element and/or filter arrangement are the subject matter of the dependent claims and of the exemplary embodiments of the filter element and/or filter arrangement as described in the following. Moreover, the filter element and/or the filter arrangement are explained in greater detail using exemplary embodiments and referencing the attached figures.

In the figures, identical reference signs designate identical or functionally equivalent elements, provided no information is provided to the contrary.

DETAILED DESCRIPTION

Figure 1:
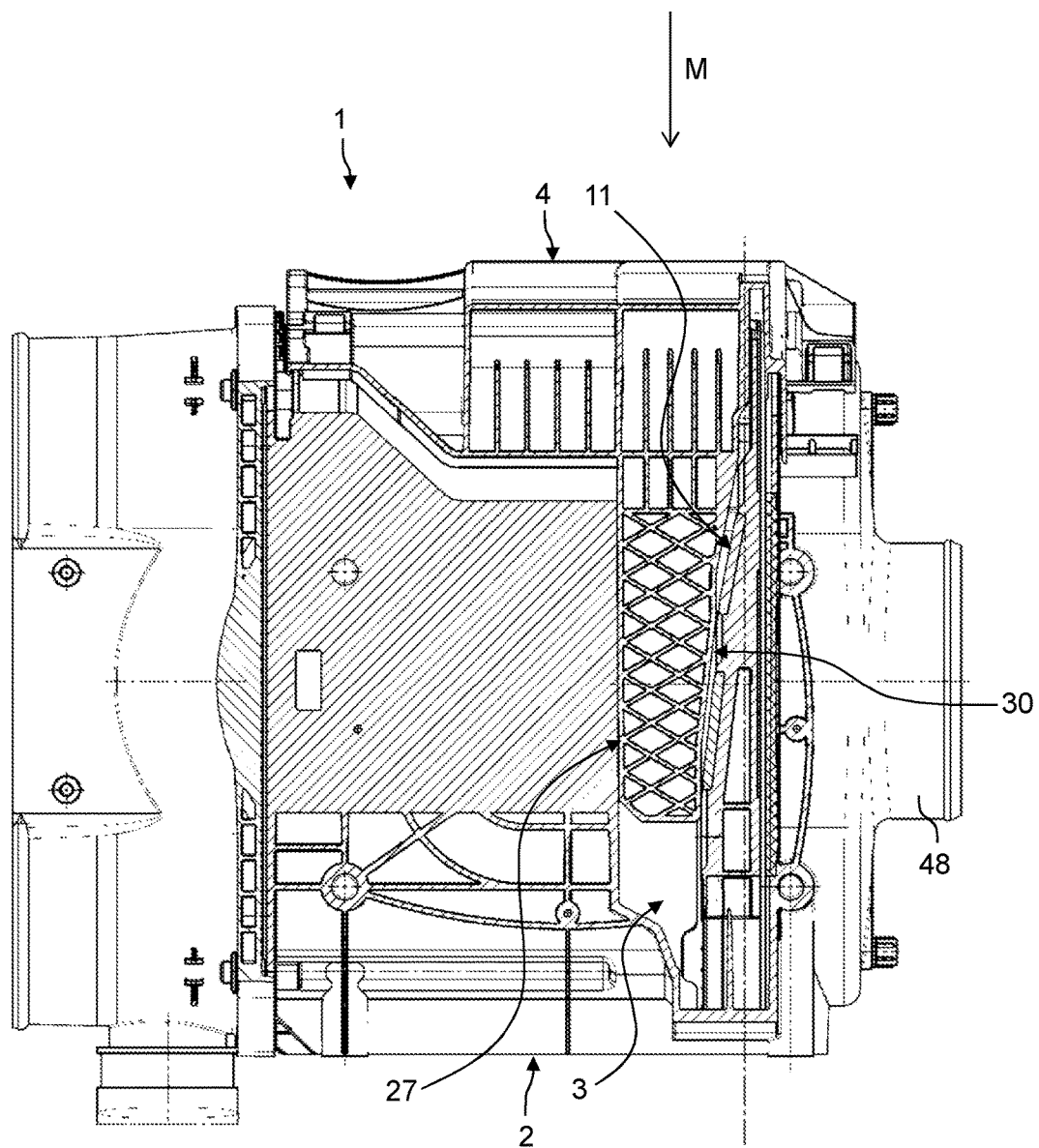
FIG. 1 is a schematic partial sectional view of one embodiment of a filter arrangement.
Figure 2:
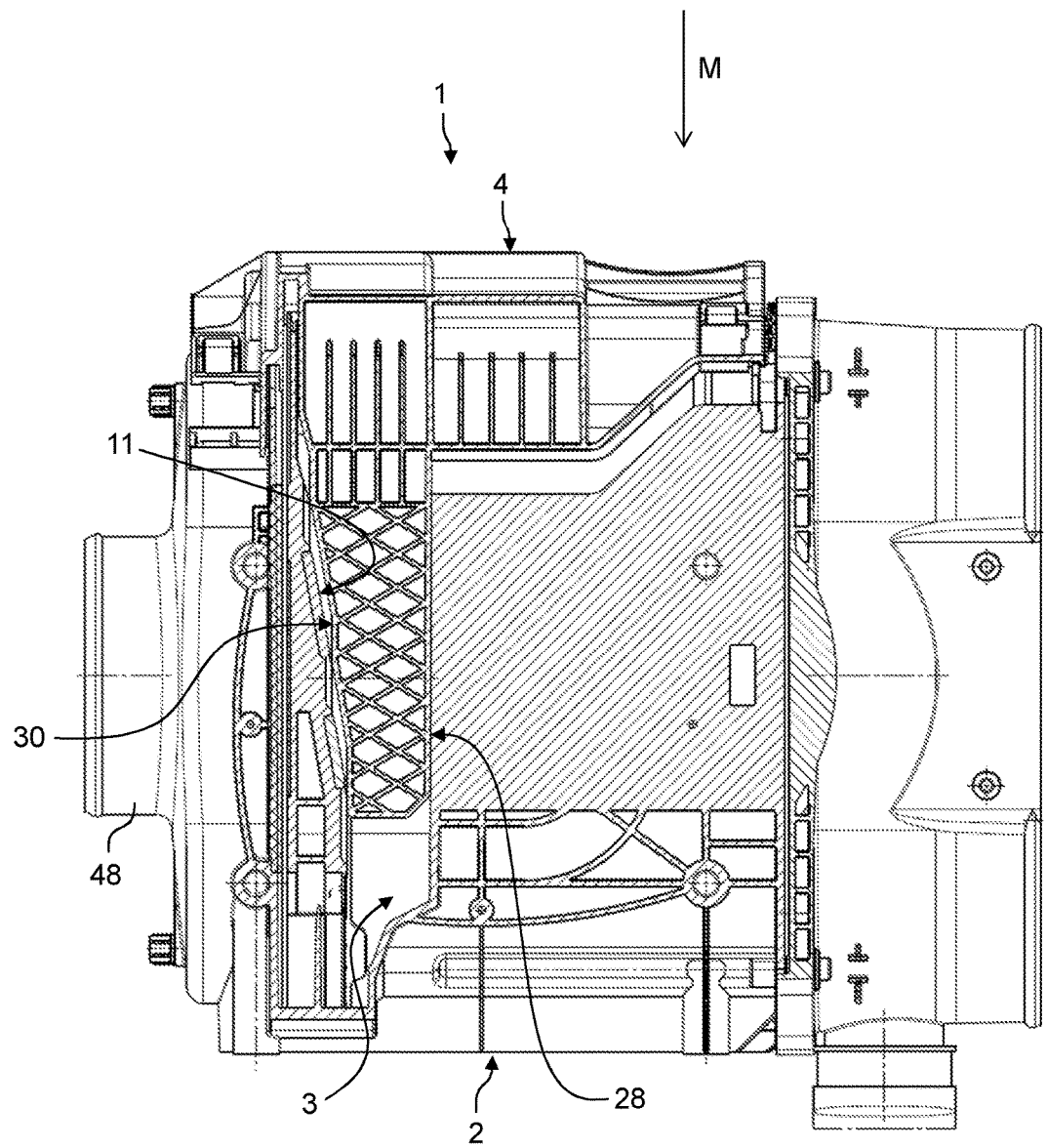
FIG. 2 is another schematic partial view of the filter arrangement according to FIG. 1.

FIGS. 1 and 2 each provide a schematic partial sectional side view of a filter arrangement 1. The filter arrangement 1 comprises a filter receiving element or a filter housing 2, a filter insert or filter element 3 (FIGS. 3 through 5), and a housing cover or cover 4 for closing the filter housing 2. The filter element 3 may also be called the primary filter element. The cover 4 and the filter element 3 may be inserted into the filter housing 2 in an installation direction or assembly direction M. The filter housing 2 is depicted in cross-section in FIGS. 1 and 2 so that the part of the filter element 3 is visible. The cover 4 is depicted partially withdrawn from the filter housing 2 in FIGS. 1 and 2.

The filter element 3 is designed for filtering fluids, such as for example air or other gases, liquids, especially operating fluids for a vehicle, especially a motor vehicle, such as oil, water, diesel fuel, gasoline, kerosene, or urea solution. In particular, the filter element 3 is an air filter element. The filter element 3 may be used in motor vehicles, watercraft, rolling stock, agricultural vehicles, construction equipment, especially air compressors, aircraft, and the like. Furthermore, the filter element 3 may also be used in non-mobile applications, such as for instance in building system engineering.

Figure 3:
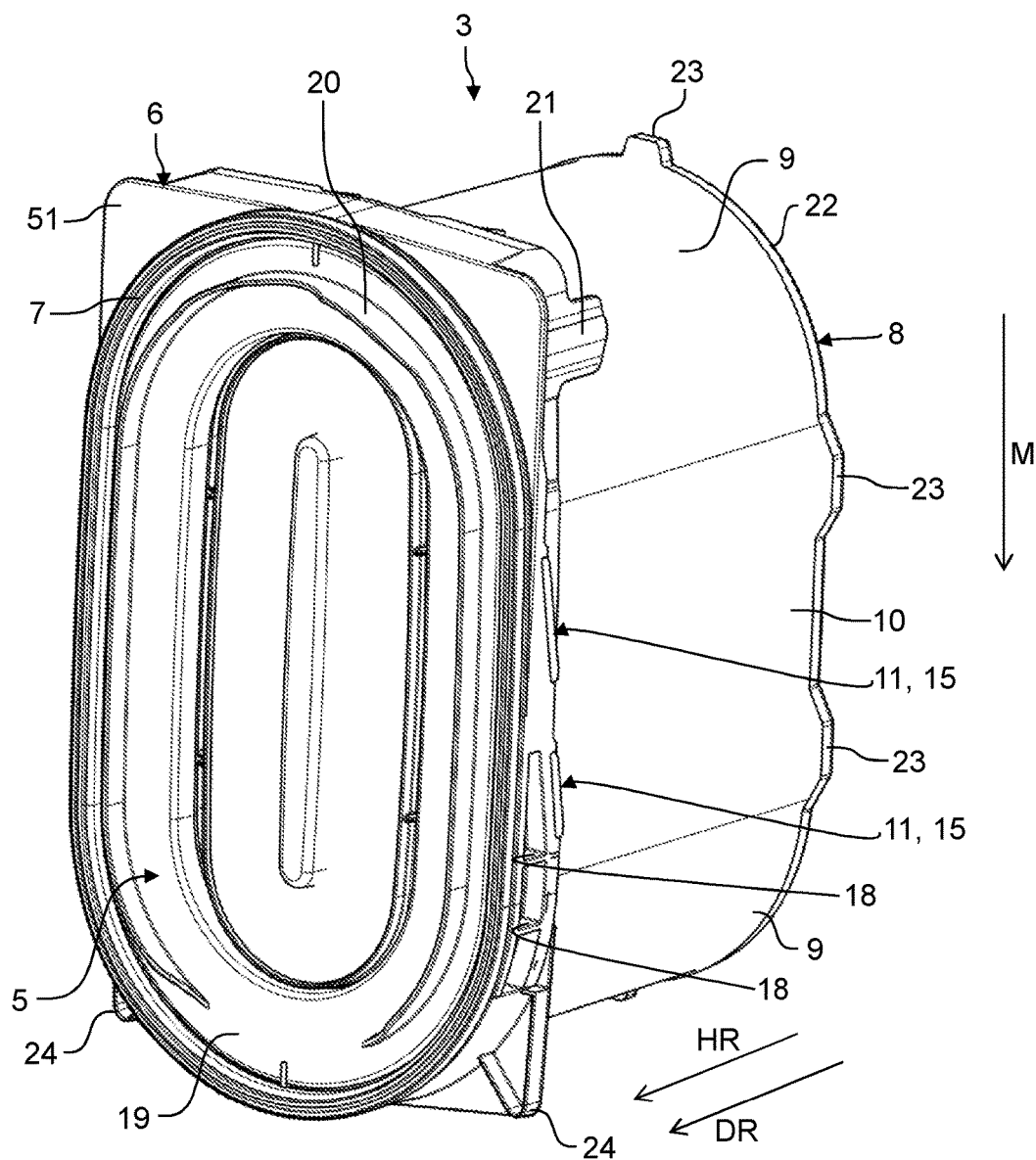
FIG. 3 is a schematic perspective elevation of one embodiment of a filter element for the filter arrangement according to FIG. 1.
Figure 4:
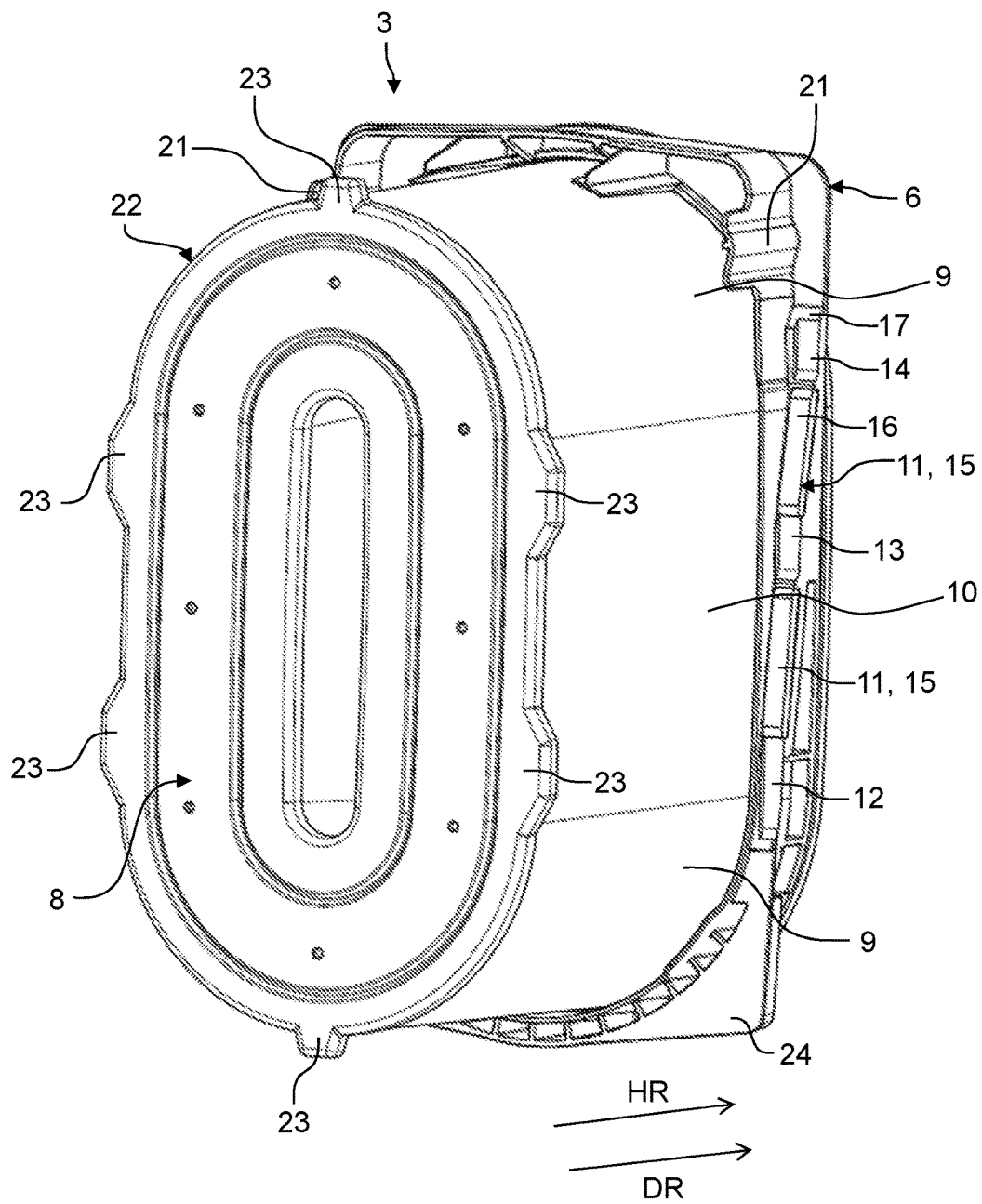
FIG. 4 is another schematic perspective elevation of the filter element according to FIG. 3.
Figure 5:
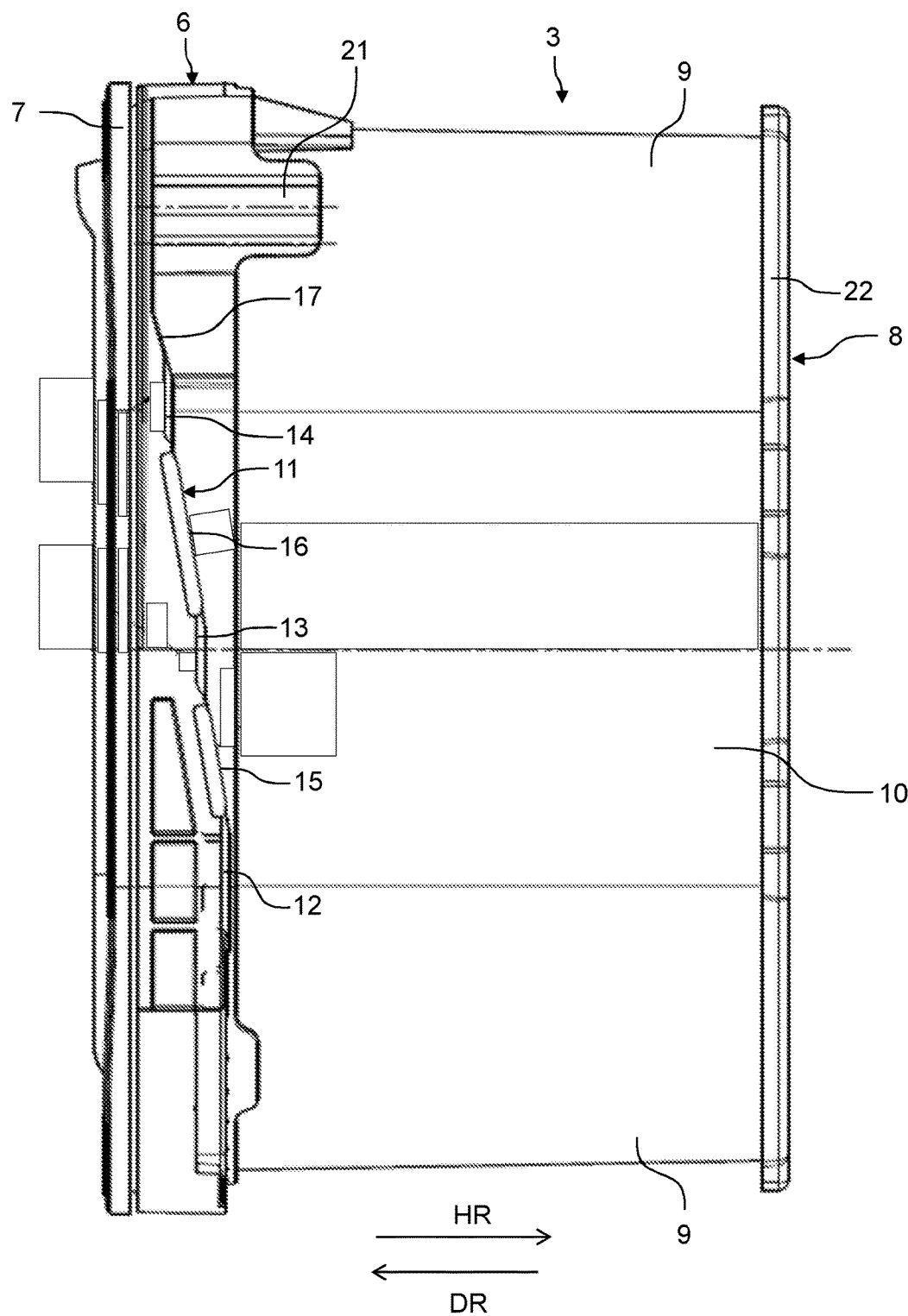
FIG. 5 is a schematic side view of the filter element according to FIG. 3 and FIG. 4.

FIGS. 3 and 4 are each schematic perspective elevations of an embodiment of the filter element 3. FIG. 5 is a side view of the filter element 3. The filter element 3 comprises an outlet-side end surface 5 having a frame 6 that bears an axially acting seal or an axially acting sealing element 7. The filter element 3 is formed from two pleated, annular filter media bellows. The filter media bellows each have an oval cross-section with two straight, mutually opposing parallel segments. A smaller filter media bellows is arranged concentrically in an annular space enclosed by the larger filter media bellows such that a flow channel for the flowing medium to be filtered is formed between the filter media bellows. Alternatively, also possible are filter bodies made of flat filter bellows folded in a zigzag pattern in which the inlet-side and outlet-side fold edges each preferably form flat end surfaces, especially inflow and outflow surfaces, that are spaced apart from one another in the flow direction. It is also possible to use filter bodies having a plurality of mutually closed channels that are formed by alternating smooth and rippled layers of a filter medium, the layers being disposed on top of one another.

The flow channel forms a discharge opening of the filter element 3 in the area of the outlet-side end surface 5 of the filter element 3. The filter media bellows are tightly joined to one another at an inlet-side end surface 8. An interior of the smaller filter media bellows is tightly closed by an end disk, or a similar construction, in the area of the outlet-side end surface 5. In this manner the flow travels through the larger filter media bellows from the exterior to the interior and through the inner filter media bellows from the interior to the exterior. Thus, a reversal of the flow is achieved on the filter element 3, wherein the flow diverges from a primary flow direction HR defined by the connection of the inlet-side end surface 5 to the outlet-side end surface 8.

In the area of the outlet-side end surface 5, the frame 6 encircles lateral surfaces 9, 10 of the filter element 3, wherein the frame 6 forms a rectangular cross-section using four projections, especially for support, along curved lateral surfaces 9 and straight lateral surfaces 10 of the filter element 3. Along each of the straight lateral sides 10 of the filter element 3, the frame 6 has a contact surface 11 for clamping the filter element 3 in the filter housing 2. That is, one such contact surface 11 is provided on both sides of the filter element 3, wherein the contact surfaces 11 are oriented opposing a sealing direction DR of the sealing element 7 and opposing the primary flow direction HR. The sealing direction DR may also be oriented opposing the primary flow direction HR.

The contact surfaces 11 have a height profile running along the straight lateral surfaces 10, wherein, in some regions of the height profile, the contact surfaces 11 may have a surface normal that is not parallel to the primary flow direction HR but instead forms an angle thereto. In the illustrated embodiment of the filter element 3, the height profile comprises flat or straight segments 12 through 14, as FIGS. 4 and 5 depict, especially a first straight segment 12, a second straight segment 13, and a third straight segment 14, that run parallel to the outlet-side end surface 5, and furthermore inclined or oblique segments 15 through 17, especially a first oblique segment 15, a second oblique segment 16, and a third oblique segment 17, that have a positive rise along the straight lateral surfaces 10 in the assembly direction M, wherein the height or the distance of each contact surface 11 to the outlet-side end surface 5 increases. The contact surface 11 is reinforced on the back side by ribs 18.

The assembly direction M thus forms a preferred direction along which the height of the contact surfaces 11 primarily increases. On the outlet-side end surface 5 of the filter element 3, the frame 6 forms an end disk 19 that covers an end face of the larger filter media bellows. Arranged on this end disk 19 is the axially acting sealing element 7, in particular securely joined to the end disk 19, and its shape mirrors an exterior contour of the larger filter media bellows. Provided within the sealing element 7 is a partially or completely circumferential rib 20 that projects axially from the end disk 19 and that runs around the end disk 19 at a constant distance from the sealing element 7. This rib 20 facilitates assembly and/or disassembly in arrangements in which the filter element 3 is assembled or disassembled overhead.

The circumferential rib 20 drops or is interrupted at the end of the frame 6 disposed in the assembly direction M, and the circumferential rib 20 is higher than the rest of the rib 20 at the opposing end. In the areas that are not dropped, the rib 20 projects axially beyond the sealing element 7. A plane defined by a contact surface of the sealing element 7 with the sealing element 7 in its original state is thus intersected by the circumferential rib 20. At the end of the filter element 3 opposing the assembly direction M, the frame 6 may comprise two guide projections 21 that run in opposition to the primary flow direction HR away from the end disk 19 and have a greater distance from the straight lateral surfaces 10 or their imaginary extensions than the surrounding areas of the frame 6.

The inlet-side end faces of the filter media bellows are tightly joined to one another by means of an end disk 22 made of flexible material, for instance foamed polyurethane, wherein the end faces are completely closed in a fluid-tight manner. The end disk 22 has, in the area of the lateral surfaces 9, 10, integrally molded spacers 23 that can ensure flexible, vibration-proof support of the filter element 3 in the filter housing 2. Furthermore, the frame 6 comprises guide projections 24 disposed in the assembly direction M.

Figure 6:
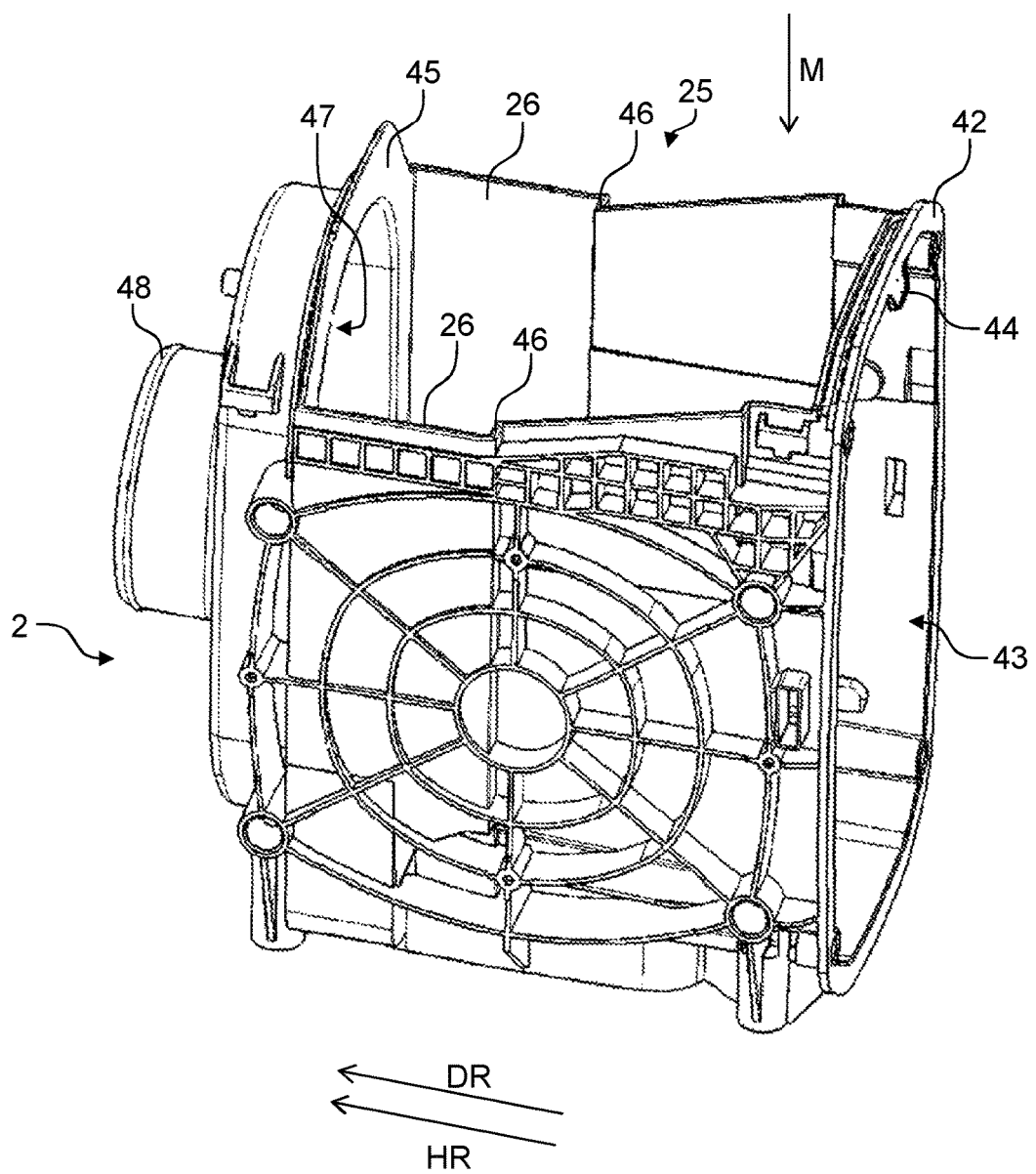
FIG. 6 is a schematic perspective elevation of one embodiment of a filter housing for the filter arrangement according to FIG. 1.

FIG. 6 is a schematic perspective elevation of one embodiment of the filter housing 2. An upper area of the filter housing 2 has an assembly opening 25 through which the filter element 3 may be inserted in a top-down manner in the assembly direction M. The assembly opening 25 depicted in FIG. 6 may be closed by the cover 4 illustrated in FIGS. 1 and 2. Provided in the filter housing 2 are two mutually opposing bulges 26 into which fit clamping elements 27, 28 (FIGS. 1 and 2) that are preferably integrally joined to the cover 4. That is, the clamping elements 27, 28 are introduced into the filter housing 2 in the assembly direction M. The clamping elements 27, 28 are different.

Figure 7:
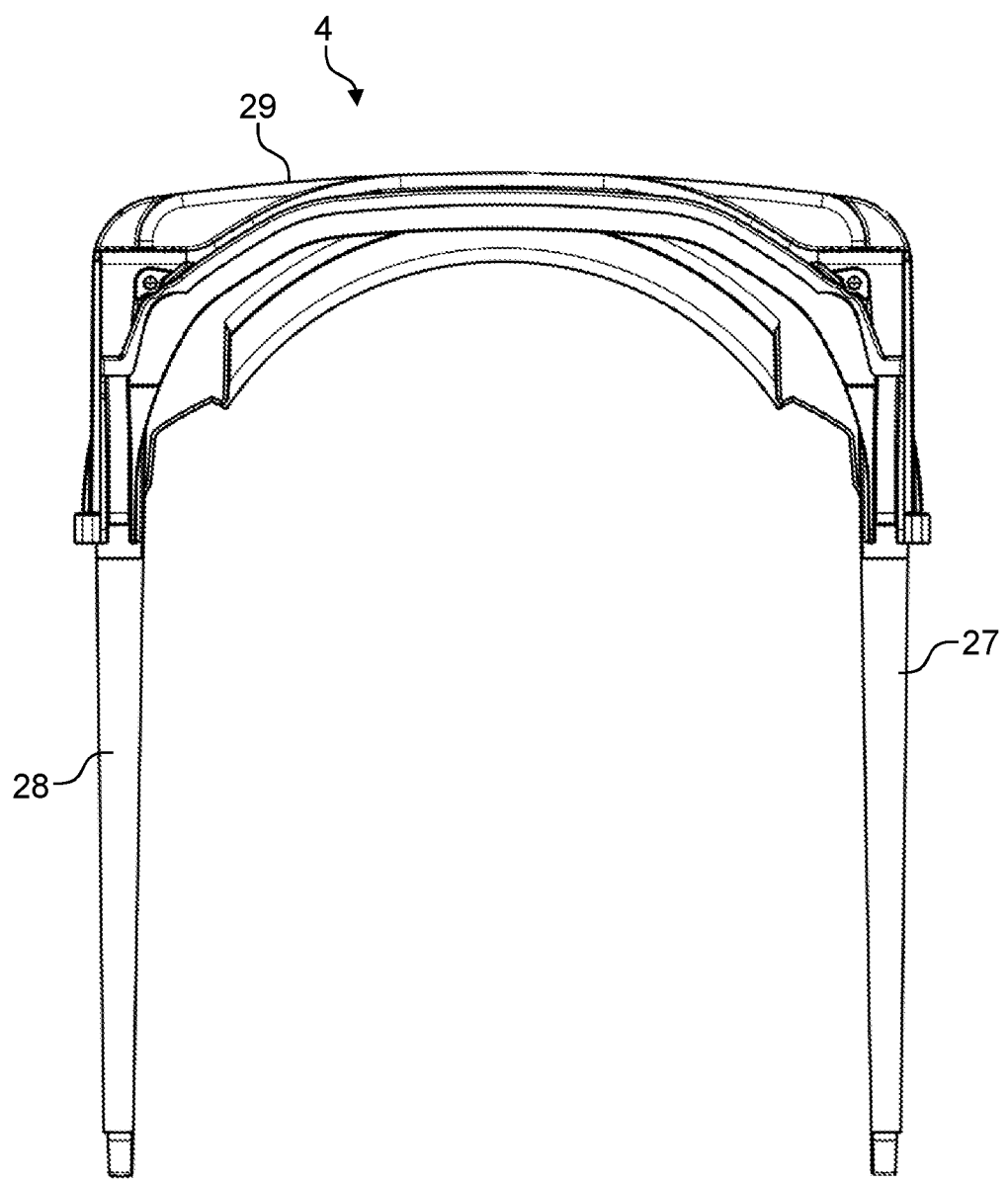
FIG. 7 is a schematic front view of one embodiment of a cover for the filter arrangement according to FIG. 1.
Figure 8:
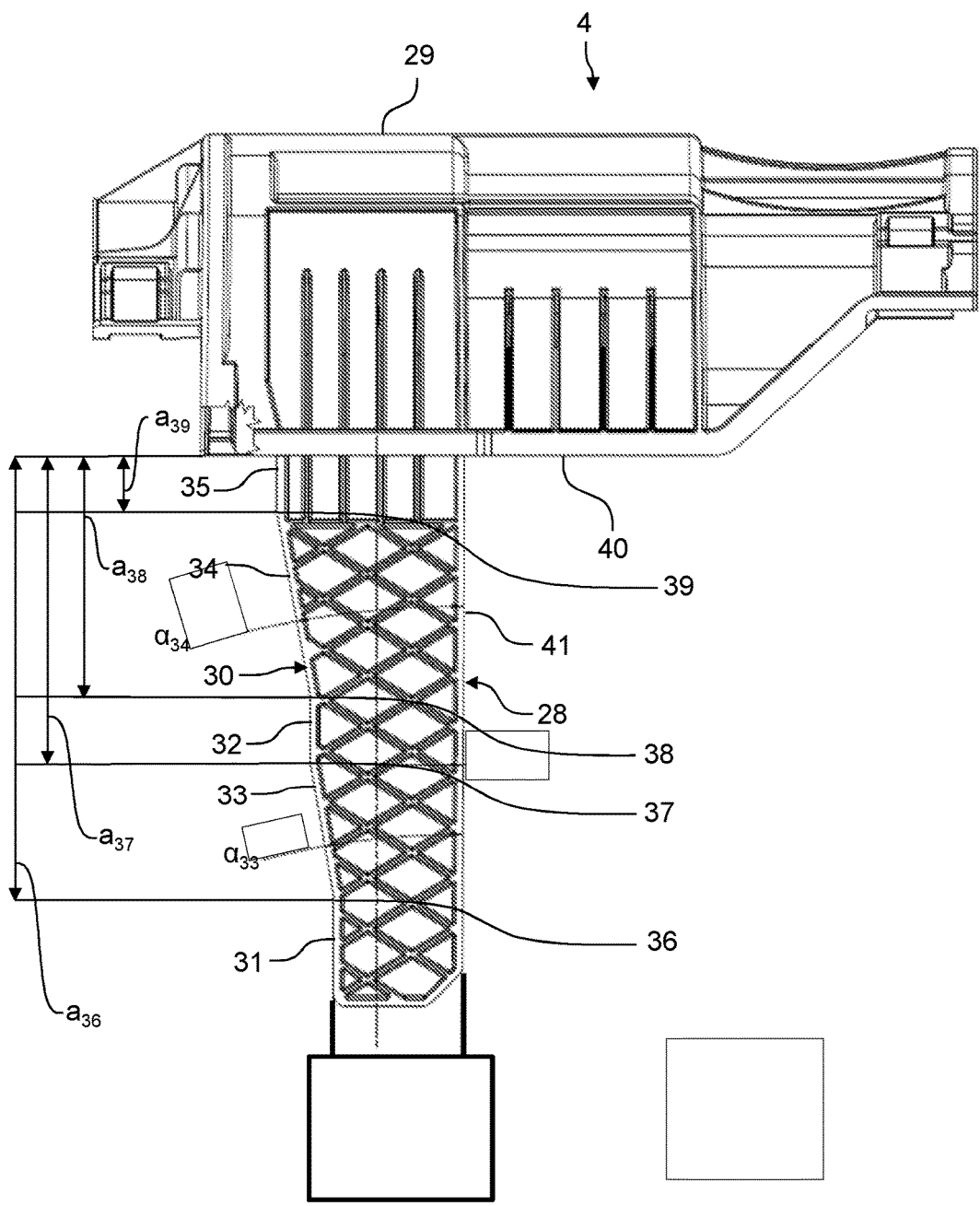
FIG. 8 is a schematic side view of the cover according to FIG. 7.
Figure 9:
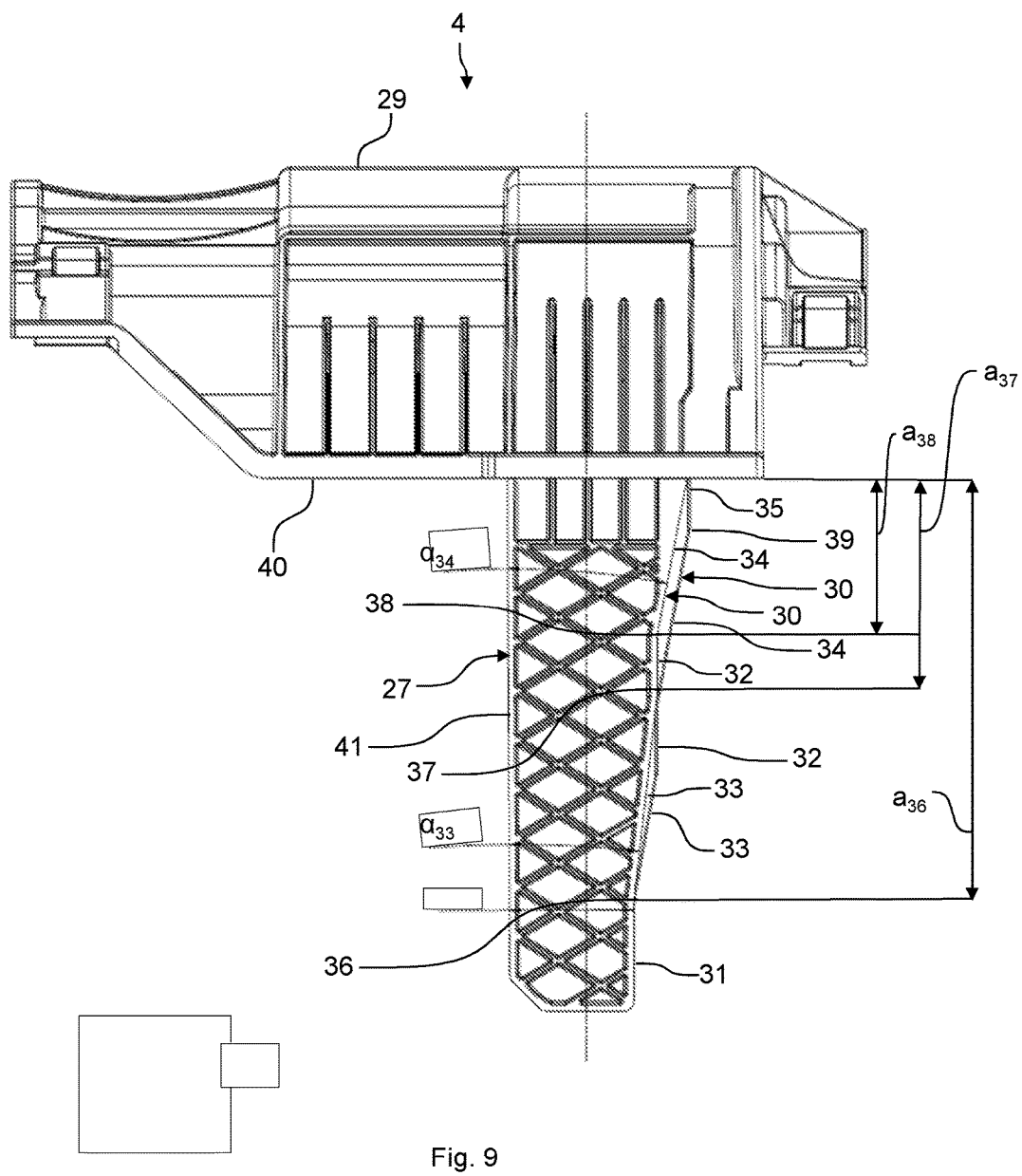
FIG. 9 is another schematic side view of the cover according to FIG. 7.

As illustrated in FIGS. 7 through 9, the cover 4 has a base segment 29 from which a first clamping element 27 and a second clamping element 28 extend laterally. The clamping elements 27, 28 may be called clamping brackets. The base segment 29 is designed to close the assembly opening 25 of the filter housing 2. The cover 4 and the filter housing 2 may be plastic injection molded components. In this way it is possible to produce them cost-effectively in large numbers.

As illustrated in FIGS. 8 and 9, the clamping elements 27, 28 each have a clamping surface 30, each of which has a height profile that may be brought, at least in part, into a positive fit with the height profile of the corresponding contact surface 11 of the filter element 3, wherein the corresponding height profiles complement one another. Each clamping surface 30 has flat or straight segments 31, 32 that run in the assembly direction M and inclined or oblique segments 33, 34 that run obliquely to the straight segments 31, 32. The clamping surface 30 of the second clamping element 28 comprises another straight segment 35 that the clamping surface 30 of the first clamping element 27 does not comprise.

The oblique segments 33, 34 have a negative rise along the clamping elements 27, 28 in the assembly direction M, wherein the height or distance drops from each clamping surface 30 to the outlet-side end surface 5. Negative rise shall be construed to mean that the oblique segments 33, 34 are oriented in the direction of the assembly direction M such that the height or distance drops from each clamping surface 30 to the outlet-side end surface 5. The straight segments 31, 32 and the oblique segments 33, 34 alternate. An edge 36 is provided between the first straight segment 31 and the first oblique segment 33. An edge 37 is provided between the first oblique segment 33 and the second straight segment 32. An edge 38 is provided between the second straight segment 32 and the second oblique segment 34. An edge 39 is provided between the second oblique segment 34 and the third straight segment 35. Respective distances $a_{36}$, $a_{37}$, $a_{38}$, $a_{39}$ for the edges 36 through 39 to a lower edge 40 of the base segment 29 are different for the two clamping elements 27, 28, so that filter elements 3 can only be received in the filter housing 2 if their contact surfaces 11 are embodied corresponding to the different geometries of the clamping elements 27, 28. In this way a lock-and-key principle can be realized.

As further illustrated in FIGS. 8 and 9, the oblique segments 33, 34 of the clamping surfaces 30 of the two clamping elements 27, 28 are also configured differently in terms of their incline to realize the lock-and-key principle. The first oblique segments 33 of the clamping surfaces 30 of the clamping elements 27, 28 may be arranged at an angle $\alpha_{33}$ to a support surface 41 of the respective clamping element 27, 28 that faces away from the clamping surfaces 30. The first oblique segment 33 of the clamping surface 30 of the first clamping element 27 may be inclined at an angle $\alpha_{33}$ of 6.64°. The first oblique segment 33 of the clamping surface 30 of the second clamping element 28 may be inclined at an angle $\alpha_{33}$ of 10.18°. The second oblique segments 34 of the clamping surfaces 30 of the clamping elements 27, 28 may be arranged at an angle $\alpha_{34}$ to the support surface 41 of the respective clamping element 27, 28. The second oblique segment 34 of the clamping surface 30 of the first clamping element 27 may be inclined at an angle $\alpha_{34}$ of 11.3°. The second oblique segment 34 of the clamping surface 30 of the second clamping element 28 may be inclined at an angle $\alpha_{34}$ of 10.55°.

Returning now to FIG. 6, the assembly opening 25 of the filter housing 2 is delimited on the inlet side by a bar or flange 42 against which the filter element 3 strikes when it is tilted within the filter housing 2, wherein it may strike in particular against a tipping rib 44 that projects from the bar 42 into a front-side opening 43 of the filter housing 2. This prevents the filter element 3 from catching on the bar 42 during removal from the filter housing 2. On a side opposing a sealing surface 45 of the filter housing 2, the bulges 26 are provided with flat support surfaces 46 on which the clamping elements 27, 28 may be supported with the flat, corresponding support surfaces 41 (FIGS. 8 and 9). The support surfaces 41 of the clamping elements 27, 28 are positioned facing away from the clamping surfaces 30. The support surfaces 41 preferably run essentially in the assembly direction M.

The assembly opening 25 drops downward, that is, in the assembly direction M, in an interior area of the filter housing 2 that is adjacent to the sealing surface 45, in order to permit easier installation of the filter element 3 into the filter housing 2. An assembly space 47 for a secondary filter element (not shown) is disposed within the sealing surface 45 adjacent thereto in the primary flow direction HR. The geometry of an opening of the assembly space 47 is embodied such that it can receive the circumferential rib 20 of the filter element 3 and encloses said rib with a gap in particular having a width of 1 to 5 millimeters. If there is an overhead arrangement, a loosely inserted filter element 3 that is not yet clamped is thus prevented from falling out of the assembly opening 25. Adjacent to the assembly space 47 is a filtered fluid outlet 48 of the filter housing 2 that is embodied in particular as a filtered air pipe.

Figure 10:
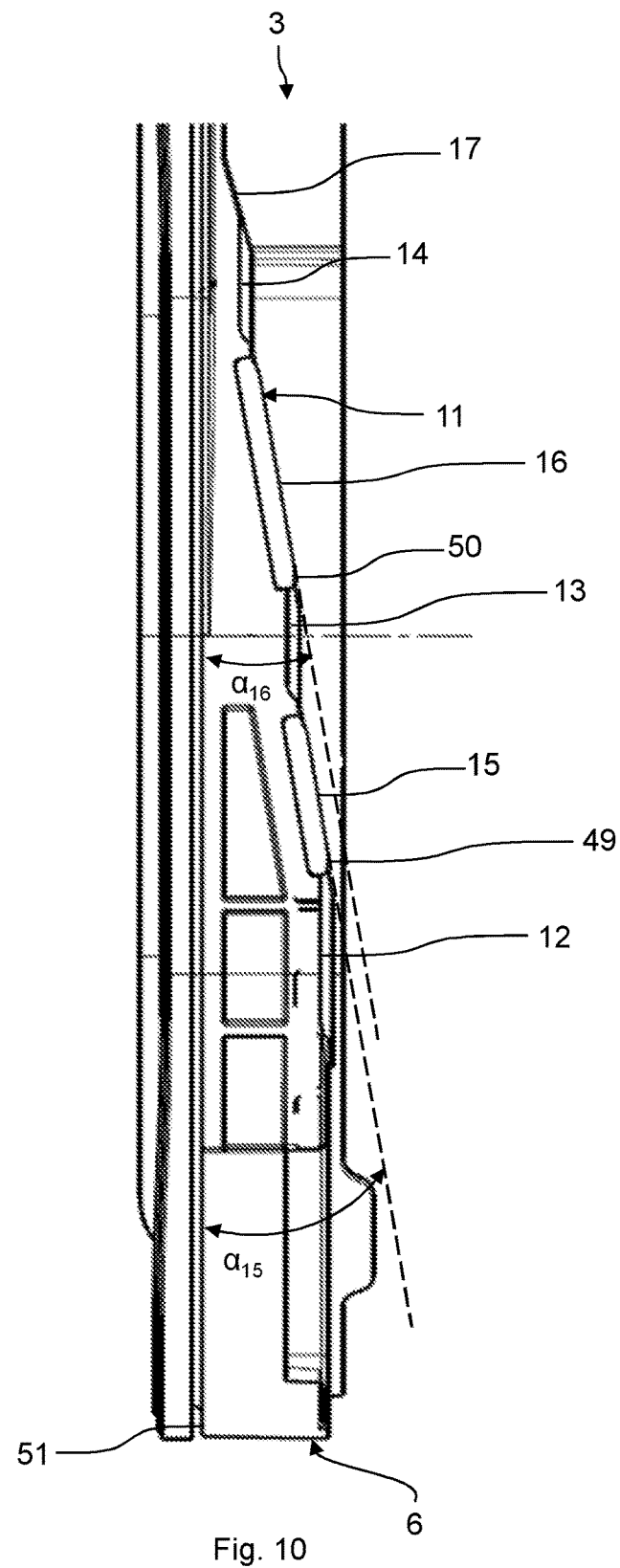
FIG. 10 is an enlarged schematic side view of the filter element according to FIG. 3.
Figure 11:
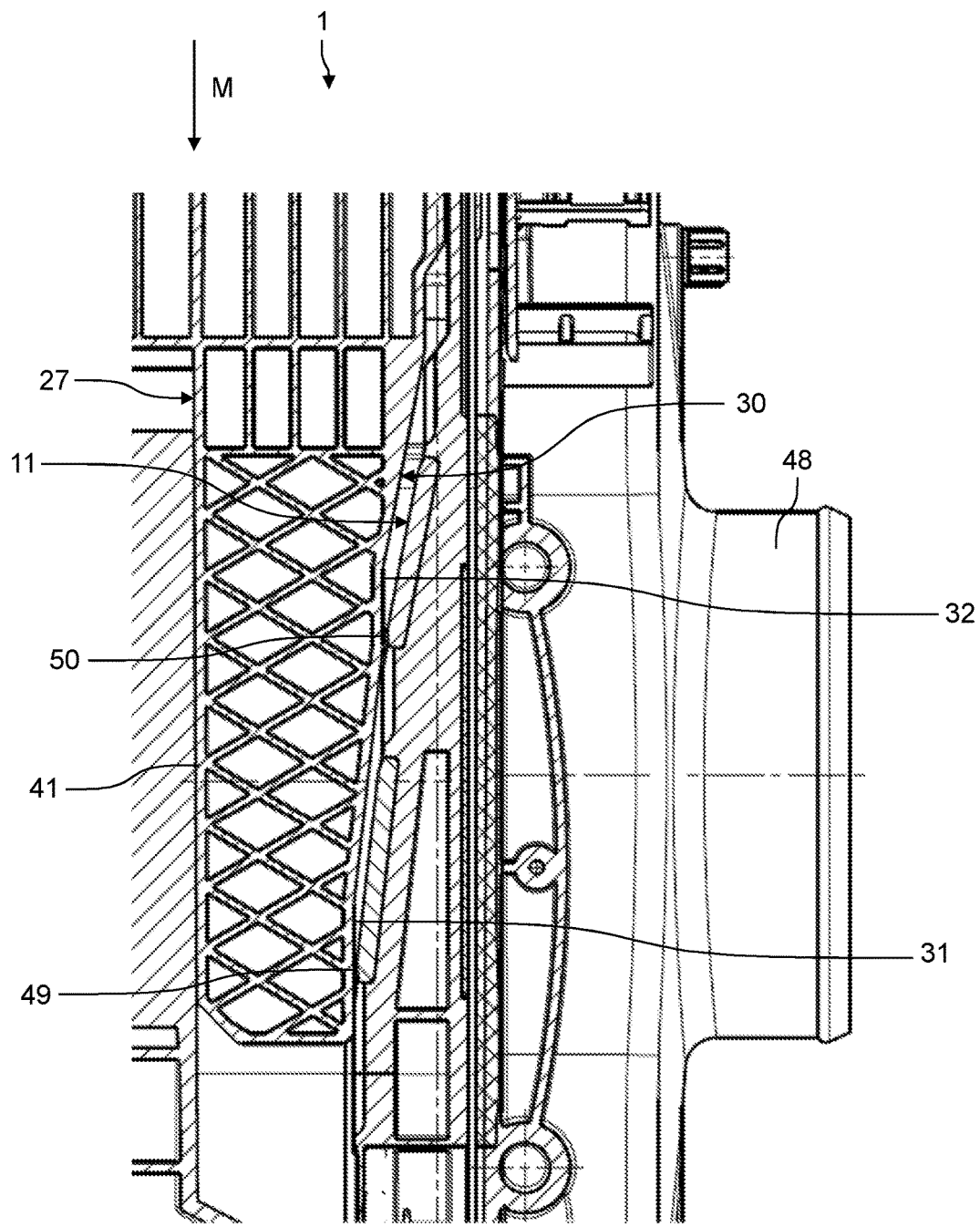
FIG. 11 is an enlarged schematic partial sectional view of the filter arrangement according to FIG. 1 (cover is not yet in the final position)
Figure 12:
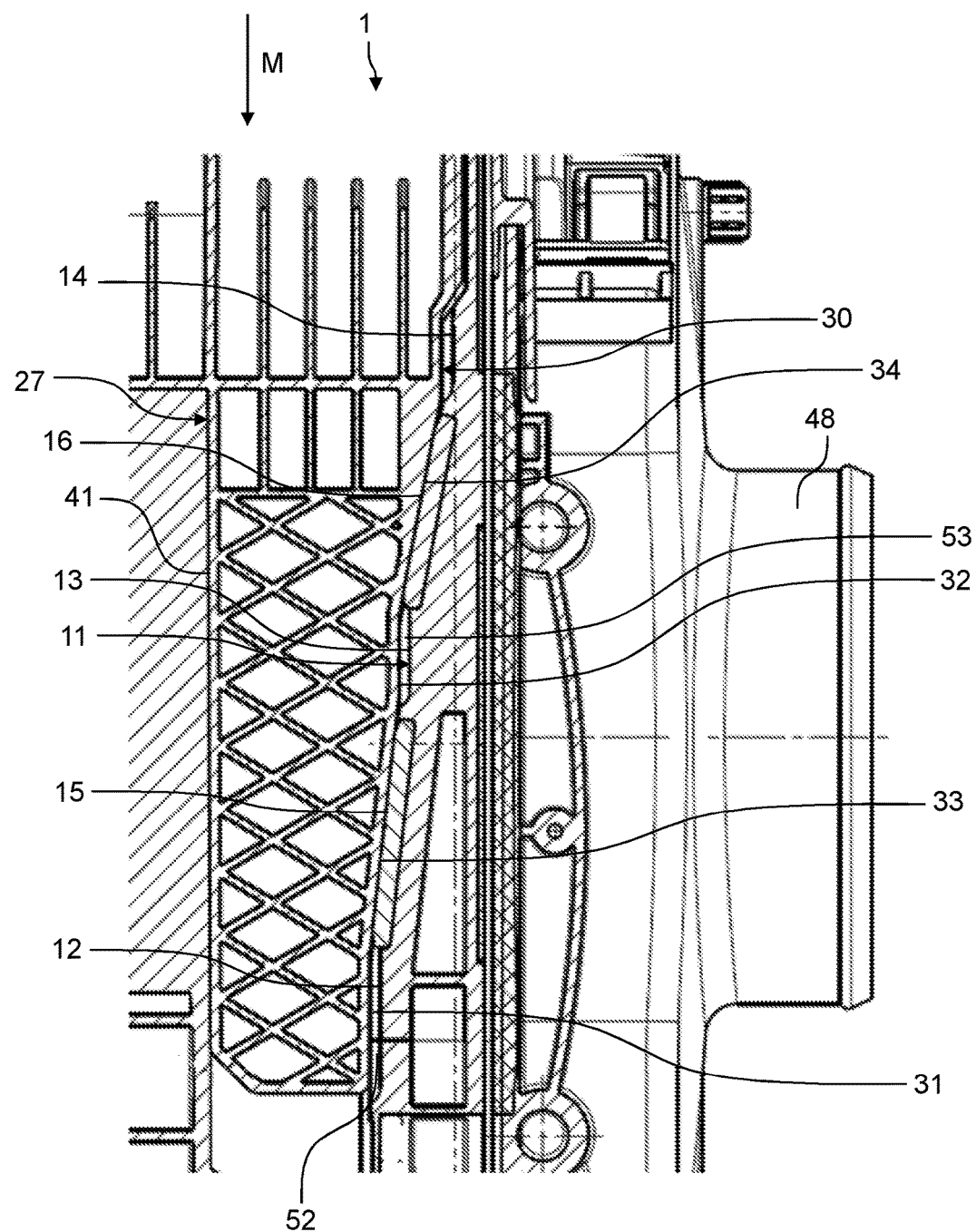
FIG. 12 is another enlarged schematic partial sectional view of the filter arrangement according to FIG. 1 (cover is in the final position)
Figure 13:
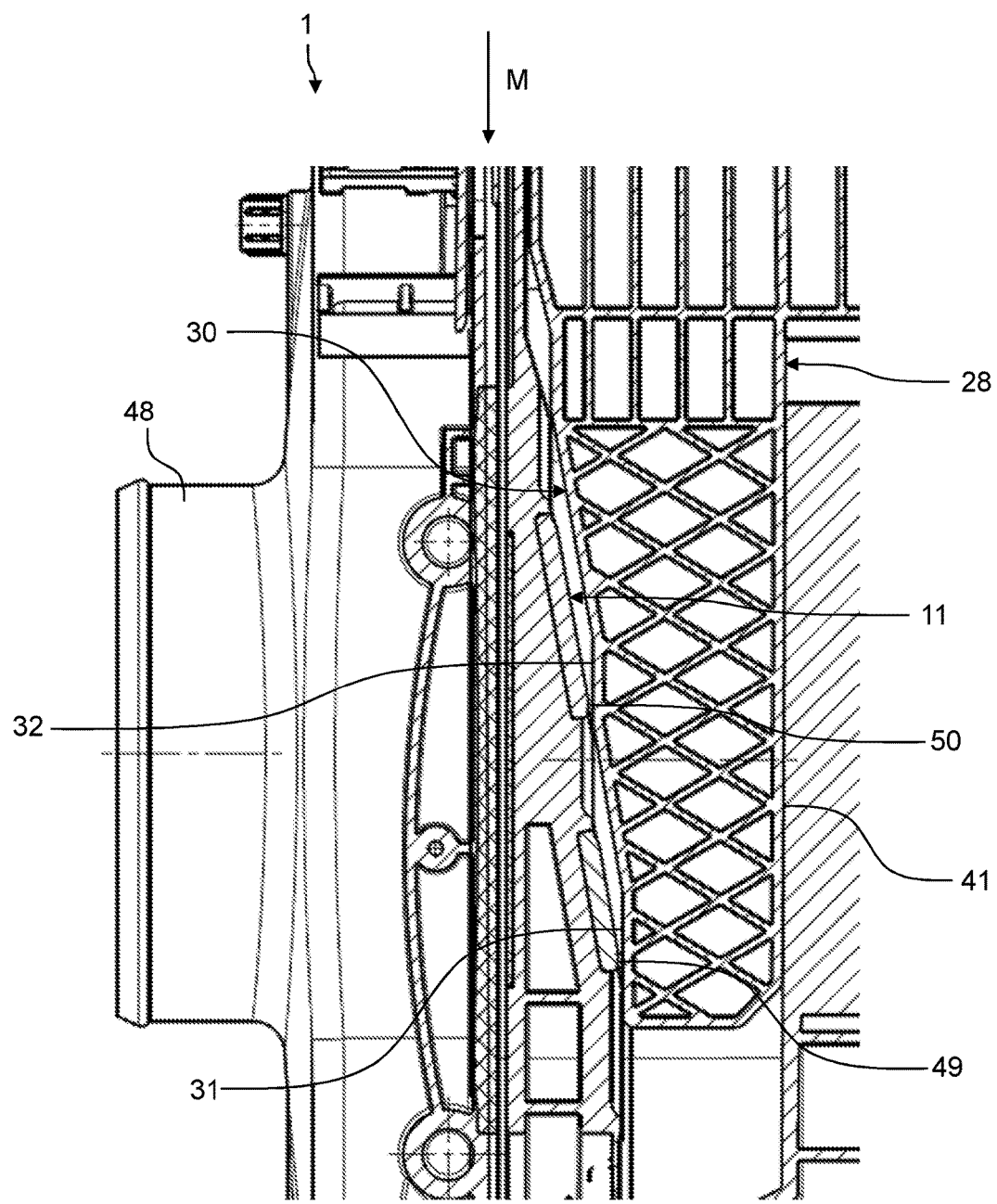
FIG. 13 is another enlarged schematic partial sectional view of the filter arrangement according to FIG. 1; and, FIG. 14 is another enlarged schematic partial sectional view of the filter arrangement according to FIG. 1.
Figure 14:
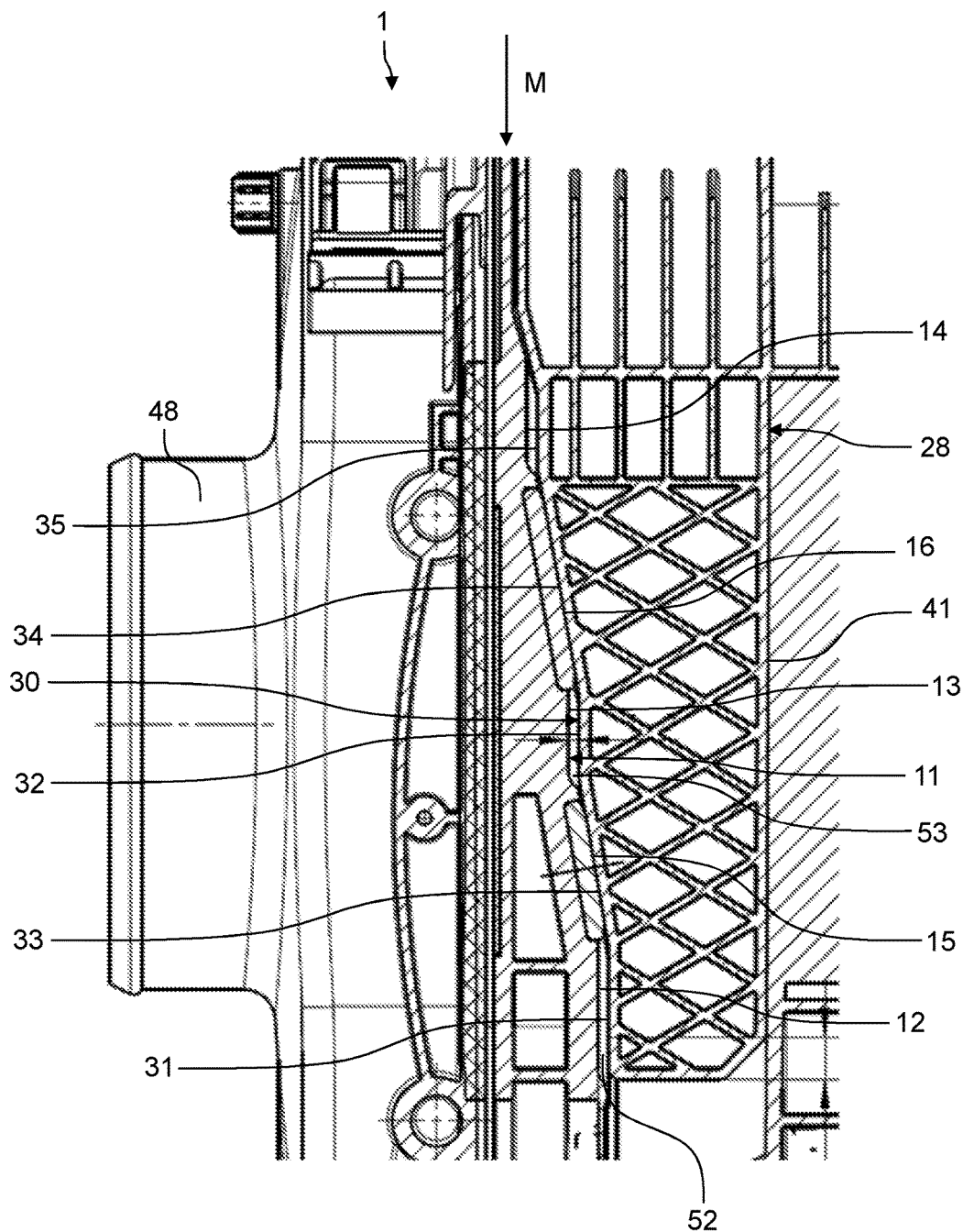

The functionality of the filter arrangement 1 and of the filter element 3 is explained in the following using FIGS. 10 through 14. FIG. 10 is an enlarged view of FIG. 5. FIG. 11 is an enlarged view of FIG. 1, in which the cover 4 is not completely inserted into the filter housing 2. FIG. 12 is an enlarged view of the filter arrangement 1, in which the cover 4 is completely inserted into the filter housing 2. FIG. 13 is an enlarged view of FIG. 2, in which the cover 4 is not completely inserted into the filter housing 2. FIG. 14 is a view of the filter arrangement 1, in which the cover 4 is completely inserted into the filter housing 2.

As FIG. 10 illustrates, the frame 6 has the contact surface 11. One such contact surface 11 is preferably provided on both sides of the frame 6, wherein the contact surfaces 11 are embodied different from one another and corresponding to the differing clamping surfaces 30 of the two clamping elements 27, 28 of the cover 4. As explained in the foregoing, this makes it possible to realize a key-and-lock principle, so that filter elements 3 with appropriately embodied contact surfaces 11 may be used for the filter arrangement 1 only. Furthermore, this prevents incorrect assembly.

The contact surface 11 illustrated in FIG. 10 comprises a first slide segment 49 provided on the first oblique segment 15. The first straight segment 12 is set back behind the first oblique segment 15 and in particular behind the first slide segment 49. The contact surface 11 further comprises a second slide segment 50 provided on the second oblique segment 16. The second straight segment 13 is set back behind the second oblique segment 16 and in particular behind the second slide segment 50. The first oblique segment 15 is positioned at an angle $\alpha_{15}$ to a front side 51 of the frame 6. The angle $\alpha_{15}$ of the first oblique segments 15 of the two contact surfaces 11 may correspond to the respective angle $\alpha_{33}$ of the first oblique segments 33 of the clamping surfaces 30 of the clamping elements 27, 28. The second oblique segment 16 is positioned at an angle $\alpha_{16}$ to the front side 51 of the frame 6. The angle $\alpha_{16}$ of the second oblique segments 16 of the two contact surfaces 11 may correspond to the respective angle $\alpha_{34}$ of the second oblique segments 34 of the clamping surfaces 30 of the clamping elements 27, 28.

FIGS. 11 and 13 illustrate a starting position of the cover 4 and of the clamping elements 27, 28. In the starting position, the sealing element 7 of the filter element 3 is not yet pressed against the sealing surface 45 and in particular is not in contact, or is only loosely in contact, with the latter. FIGS. 12 and 14 illustrate the cover 4 and the clamping elements 27, 28 in a final position in which the cover 4 and the clamping elements 27, 28 are inserted completely into the filter housing 2 and the filter element 3 is pressed against the sealing surface 45 and thus is clamped in the filter housing 2. In the final position, the sealing element 7 is pressed against the sealing surface 45 and the sealing element 7 is compressed.

When the filter element 3 is inserted into the filter housing 2 at the beginning of the insertion process, the sealing element 7 is held at a distance from the sealing surface 45 in that the circumferential rib 20 in the upper area of the sealing surface 45 is positioned against the latter. As the cover 4 is inserted farther, the movement clearance the filter element 3 has decreases to prevent the filter element 3 from jamming. This is achieved in that the guide projections 24 disposed on the frame 6 in the assembly direction M strike at least one oblique guide element, which shifts the filter element 3, as it is inserted farther into the filter housing 2, in the direction of the sealing surface 45 shortly before the insertion process concludes. At the conclusion of the insertion process, the elevated part of the circumferential rib 20 engages in the assembly space 47 of the secondary filter element and thus prevents the filter element 3 from falling out during overhead assembly before the cover 4 is assembled.

After the filter element 3 has been pre-positioned, the cover 4 may be assembled, wherein the clamping elements 27, 28 are first guided, especially with slightly frictional contact between the guide projections 21 of the filter element 3, so that the guide projections 21 may advantageously act as a brake for the cover 4 during overhead work. This reduces the risk of jamming of the clamping elements 27, 28. When the cover 4 is inserted into the filter housing 2, the sealing element 7 is pressed in that the support surfaces 41 of the clamping elements 27, 28 are supported on the support surfaces 46 of the filter housing 2 and the contact surfaces 11 of the filter element 3 are supported on the clamping surfaces 30 of the clamping elements 27, 28. As soon as the clamping surfaces 30 of the clamping elements 27, 28 come into contact with the contact surfaces 11 of the filter element 3, the filter element 3 is shifted towards the sealing surface 45, that is, in the primary flow direction HR or in the sealing direction DR, and the sealing element 7 is pressed onto the sealing surface 45, which sealingly separates an unfiltered side of the filter element 3 from a clean side thereof. The sealing element 7 preferably has a Shore A hardness of 22 to 55, preferably 27 to 41, more preferably 32 to 39, more preferably 34 to 37. Because of this, the sealing element 7 is more easily compressed or pressed than known sealing elements.

As FIGS. 11 and 13 illustrate, in the depicted embodiment, due to the geometric configurations, when the cover 4 is inserted into the filter housing 2 initially only the slide segments 49, 50 of the contact surfaces 11 of the frame 6 for the filter element 3 contact the straight segments 31, 32 of the clamping surfaces 30 of the clamping elements 27, 28. Since the straight segments 12, 13, 14 of the contact surfaces 11 are set back, they do not contact the clamping surfaces 30 of the clamping elements 27, 28.

FIGS. 12 and 14 depict the cover 4 when completely inserted into the filter housing 2, that is, in its final position. Both the first oblique segments 15, 33 and the second oblique segments 16, 34 are in surface contact. A first gap 52 is provided between the first straight segment 12 of the contact surfaces 11 and the first straight segment 31 of the clamping surfaces 30, and a second gap 53 is provided between the second straight segment 13 of the contact surfaces 11 and the second straight segment 32 of the clamping surfaces 30. Because of this, the straight segments 12, 31, 13, 32 do not do not touch one another when the cover 4 is in the final position. In the final position, the cover 4 may be securely joined to the filter housing 2, for instance using quick-release fasteners. A width of the gap 52, 53 may be 2.5 millimeters, for example.

Since the straight segments 12, 31, 13, 32 do not touch one another in the final position and therefore no friction occurs between them, either, the assembly forces and disassembly forces are further reduced towards the end of the insertion process and while the cover 4 is being pulled out. A force for pressing the filter element 3 against the sealing surface 45 and in particular for pressing the sealing element 7 in the final position is only transmitted or is essentially transmitted via the oblique segments 15, 33, 16, 34. As a result, the surface pressing between the contact surfaces 11 and the clamping surfaces 30 is very low. Therefore, only short paths are needed for inserting with high force and releasing the cover 4. This makes it easier to press the sealing element 7. The assembly forces are further reduced since the sealing element 7 has a low Shore A hardness. For locking the filter element in the final position, a contact of straight surface segments may be provided via a short length, for instance in the segment 35, however, even in the area of the frame 6 or of the contact surface 11 in which no support of the clamping element 27 by means of the support surface 41 is possible, i.e. in the area in which the contact surface is no longer opposite a support surface 41, and/or in the area that is immediately adjacent to the base segment. Because of the advantage of reliable assembly achieved by the locking effect, it is not a problem that during movement into the final position a slightly higher assembly force must be applied over a short length (for example no more than 10 or 20 mm). However, this contact in the straight area 35 does not have a clamping function, but instead only a locking function, i.e., the contact is preferably furthermore designed such that the force transmission in the final position occurs essentially, or preferably exclusively, using the oblique segments 15, 33, 16, 34. This realization of the locking function therefore does not interfere with functioning.

REFERENCE NUMBERS

1 Filter arrangement
2 Filter housing
3 Filter element
4 Cover

5 End surface
6 Frame
7 Sealing element
8 End surface
9 Lateral surface
10 Lateral surface
11 Contact surface
12 Segment
13 Segment
14 Segment
15 Segment
16 Segment
17 Segment
18 Rib
19 End disk
20 Rib
21 Guide projection
22 End disk
23 Spacer
24 Guide projection
25 Assembly opening
26 Bulge
27 Clamping element
28 Clamping element
29 Base segment
30 Clamping surface
31 Segment
32 Segment
33 Segment
34 Segment
35 Segment
36 Edge
37 Edge
38 Edge
39 Edge
40 Lower edge
41 Support surface
42 Bar
43 Opening
44 Tipping rib
45 Sealing surface
46 Support surface
47 Assembly space
48 Filtered fluid outlet
49 Slide segment
50 Slide segment
51 Front side
52 Gap
53 Gap
$a_{36}$ Distance
$a_{37}$ Distance
$a_{38}$ Distance
$a_{39}$ Distance
DR Sealing direction
HR Primary flow direction
M Assembly direction
$\alpha_{15}$ Angle
$\alpha_{16}$ Angle
$\alpha_{33}$ Angle
$\alpha_{34}$ Angle

What is claimed is:
1. A filter element for a filter arrangement, the filter element comprising:
a filter media forming a filter bellows;
an end disk arranged on an axial end of the filter bellows of the filter element;
wherein the end disk forms a frame which encircles radially outer lateral surfaces of the filter bellows of the filter element;
wherein the frame of end disk that has at least one contact surface for contacting a clamping surface of at least one clamping element of the filter arrangement;
wherein the at least one contact surface of the frame formed by the end disk has straight segments and oblique segments arranged end to end, with the oblique segments arranged between the straight segments; and
wherein the straight segments are arranged such that the clamping surface when the latter is displaced relative to the at least on contact surface essentially exclusively contacts the oblique segments.

2. The filter element according to claim 1, wherein the oblique segments each comprise slide segments that are configured to contact the clamping surface when the clamping surface is displaced relative to the at least one contact surface.

3. The filter element according to claim 2, wherein a first straight segment is set back, with respect to a front side of the frame, behind a first slide segment, and/or, wherein a second straight segment is set back, with respect to the front side of the frame, behind a second slide segment.

4. The filter element according to any of claim 1, wherein a first oblique segment is inclined at a first angle to the front side of the frame and/or a second oblique segment is inclined at a second angle to the front side of the frame.

5. The filter element according to claim 4, wherein the first angle differs from the second angle.

6. The filter element according to claim 4, comprising two contact surfaces that are arranged on an edge of the frame,
wherein the two contact surfaces are geometrically different from one another.

7. The filter element according to claim 6, wherein the first angles of the first oblique segments of the two contact surfaces differ from one another, and/or,
wherein the second angles of the second oblique segments of the two contact surfaces differ from one another.

8. The filter element according to claim 1, wherein the filter element has a sealing element that has a Shore A hardness of 22 to 55.

9. The filter element according to claim 8, wherein the filter element has a sealing element that has a Shore A hardness of 34 to 37.

10. The filter element according to claim 1 for a filter arrangement, comprising:
a frame that includes at least one contact surface configured to contact a clamping surface of at least one clamping element of the filter arrangement,
wherein the at least one contact surface comprises at least two oblique segments, with respect to an assembly direction, that are offset in the assembly direction, and
wherein the oblique segments are offset such that the second oblique segment essentially begins at the height at which the first oblique segment ends,
wherein the contact surface is configured outside of the oblique segments such that when installed the oblique segments essentially exclusively contact the clamping surface.

11. An air filter arrangement, comprising:
a filter housing;
a filter element according to claim 1 received into the filter housing; and at least one clamping element clamping the filter element in the filter housing such that, when at least one clamping element is in a final position, the filter element is pressed against a sealing surface of the filter housing, wherein when the at least one clamping element is displaced inward into the filter housing from a starting position into a final position, the filter element may be displaced by sliding the clamping surface on the at least one contact surface in a sealing direction onto the sealing surface, and wherein in the final position a force for pressing the filter element against the sealing surface using at least one oblique segment of the clamping surface is transmitted to at least one of the oblique segments of the at least one contact surface.

12. The air filter arrangement according to claim 11, wherein the force for pressing the filter element against the sealing surface is transmitted to the at least one oblique segment of the at least one contact surface solely using the at least one oblique segment of the clamping surface.

* * * * *